United States Patent [19]

Zeman

[11] Patent Number: 4,688,599

[45] Date of Patent: Aug. 25, 1987

[54] DISTRIBUTION FITTING

[76] Inventor: David Zeman, P.O. Box 42040, Las Vegas, Nev. 89116

[21] Appl. No.: 798,308

[22] Filed: Nov. 15, 1985

[51] Int. Cl.⁴ .............................................. E03B 7/00
[52] U.S. Cl. ................................ 137/561 A; 285/192; 137/561 R
[58] Field of Search ....................... 137/561 R, 561 A; 239/552, 559, 567; 285/192

[56] References Cited

U.S. PATENT DOCUMENTS

| | | | |
|---|---|---|---|
| 1,598,996 | 9/1926 | Wheelock | 239/559 |
| 2,311,266 | 2/1943 | Svet | 239/567 |
| 2,985,381 | 5/1961 | Cadella | 239/559 |
| 3,773,257 | 11/1973 | Hruby, Jr. | 239/552 X |
| 4,422,471 | 12/1983 | Faccini | 137/561 A |
| 4,480,793 | 11/1984 | Grande | 239/567 |
| 4,491,271 | 1/1985 | Hasenack | 239/567 X |

Primary Examiner—Alan Cohan
Assistant Examiner—John A. Rivell
Attorney, Agent, or Firm—Edward D. O'Brian

[57] ABSTRACT

A distribution fitting primarily useful in connection with drip or seep irrigation can be constructed so as to utilize a series of ports defined by circular holes located immediately adjacent to one another around a spherical wall, each of the ports being constructed so to serve as a compression fitting.

9 Claims, 3 Drawing Figures

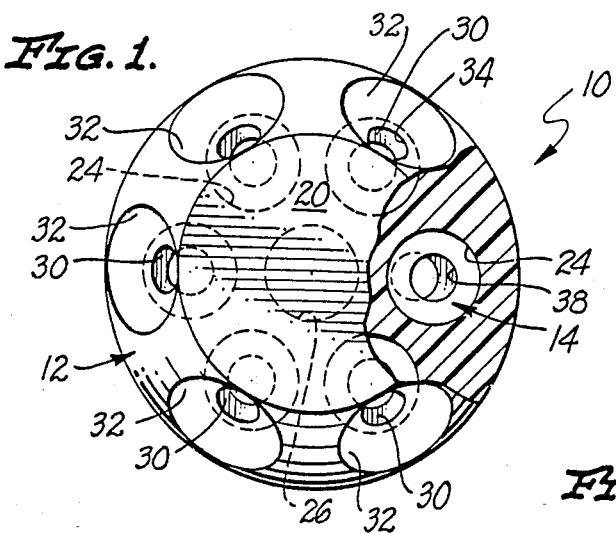
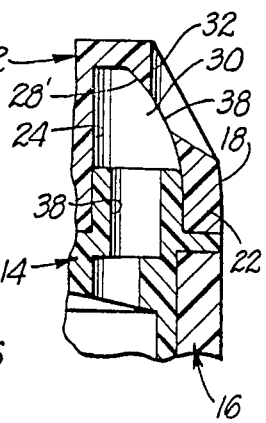
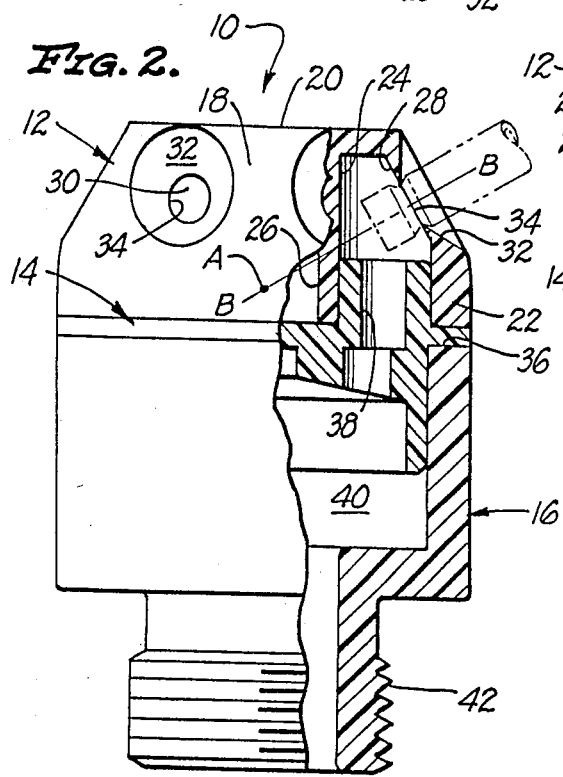

4,688,599

DISTRIBUTION FITTING

BACKGROUND OF THE INVENTION

This invention pertains to new and improved distribution fittings which are primarily useful in connection with drip or seep irrigation.

In this field it is frequently necessary or desirable to convey water from a source such as a comparatively large hose, a flow restriction device, a distribution manifold or the like to a plurality of different, separate locations. Although it is possible to accomplish this objective utilizing a single hose having a plurality of outlets along its length extending from such a source it is commonly desirable to utilize a series of separate, hoses each of which leads from such a source to a location to where water has to be delivered. Commonly, such separate tubes are formed of a material such as any of the series of conventional polymers so that they are somewhat flexible and somewhat resilient.

Since the water supplied to such tubes is normally at a comparatively low pressure it is common in drip irrigation field to attach such cylindrical tubes to a water source as indicated in the preceding using a socalled compression fitting or connection. Such a fitting or connection essentially consists of a circular hole of restricted diameter in a rigid or comparatively rigid member of slightly smaller diameter than the tube. The tube is secured to such a fitting by being forced through the hole so that the exterior of the tube will be held under compression as it is engaged by the wall of the hole. It is important that the holes in the fittings are circular if satisfactory operation is to be obtained. Compression fittings of this type are quite utilitarian.

Unfortunately however they suffer from a limitation or defect which frequently makes their use comparatively undesirable. This limitation or defect pertains to how many separate compression fittings or connections can be crammed into a comparatively small region in such a manner that the tubes may be easily assembled upon and removed from the fitting. This is more important than one might normally realize. Tremendous numbers of fittings and the like are used in various commercial or agricultural applications of drip or seep irrigation. As a result of this even comparatively quite small cost savings can be significantly important in this field and frequently are responsible for one firm selling a product instead of another.

Although it would seem beneficial to locate a plurality of compression connections or fittings in a single composite quite closely adjacent to one another so that they all receive water from a single source in so as to achieve a cost saving by minimizing the amount of material used in the composite fitting, there is a severe disadvantage to this. When individual compression fittings are located comparatively close to one another in a larger fitting the mere proximity of these fittings frequently makes it difficult or nearly impossible to attach tubes to or to remove tubes from such fittings.

BRIEF SUMMARY OF THE INVENTION

As a consequence of the preceding factors it is believed that there exists a need for new and improved distribution fitting. More specifically it is considered there is a need for a new and improved distribution or compression fittings which can be easily and conveniently used to connect a series of tubes to or disconnect such tubes from a single water source, which are desirable because their comparatively small size permits savings to be achieved in the amount of material used in their construction and which are capable of being easily and conveniently used in connection with tubes such as are commonly employed for drip or seep irrigation purposes.

In accordance with this invention these various objectives are achieved by providing a distribution fitting having a plurality of outlet ports, each of said ports being adapted to be connected to a distribution tube in which the improvement comprises: said distribution fitting having a spherical wall, said ports being located in said wall, said wall having a uniform thickness adjacent to and surrounding each of said ports, each of said ports being defined by a circular hole located in said spherical wall, each of said ports being located so that in an imaginary line located perpendicular to its center would intersect the center of said spherical wall.

BRIEF DESCRIPTION OF THE DRAWINGS

Because of the nature of this invention it is best more full explained with reference to the accompanying drawing in which:

FIG. 1 is a side elevational view, parts of which have been broken away of a presently preferred embodiment of a distribution fitting in accordance with this invention;

FIG. 2 is a top plan view of this fitting, this view being partially broken away, and FIG. 3 is a view corresponding to the part of FIG. 1 shown in section showing a possible modification of the fitting shown in the prior figures.

The particular fitting illustrated is designed so as to utilize the concepts or principles of this invention set forth and defined in the appended claims. It will be realized that these concepts or principles may be embodied within other somewhat differently appearing, differently constructed distribution fittings through the use or exercise of routine design skill in the field of drip or seep irrigation.

DETAILED DESCRIPTION OF THE INVENTION

The fitting 10 shown in the drawing is constructed so as to include a cap 12, a distribution plate 14 and a base 16. All of these various parts 12, 14 and 16 are preferably formed using injection molding dies out of any of a series of known, conventional polymers such as can be and have been used for drip or seep irrigation purposes in the manufacture of pipe or tubing fittings. The cap 12 includes a spherical wall 18 which extends about a center point A as shown in FIG. 1 of the drawing. This spherical wall 18 is of a truncated shape and in effect becomes a continuation of a flat top 20 and a short cylindrical wall 22.

A number of side passages 24 are located internally within the cap 12 so as to extend parallel to one another. These passages 24 are disposed about a center hole 26 and around the center point A in a symmetrical manner so as to be located as closely adjacent to one another as reasonably possible. Each of the passages 24 terminates in a wall 28 which in effect closes off or terminates the passage 24 with which it is associated.

These walls 28 are flat walls. Because of the fact that the individual passages 24 will normally be manufactured by locating cores or core pins (not shown) in a desired orientation within a mold it is practical for the wall 28 to be completely flat adjacent to each of the ports 30. When such flat walls 28 are used the pins or cores used in making them are bevelled so as to have the same slope as the line B—B relative to a central axis (C—C) extending through the distribution fitting 10 including the center A. Further, such cores or pins must be precisely located in a mold cavity so that when the walls 28 are created that they are perpendicular to the imaginary line B—B discussed in the preceding.

Outlet ports 30 are provided in the cap 12 in association with each of the passages 24 so as to lead between the walls 18 and 28. These outlet ports 30 may be considered to consist only of circular openings (not separately numbered as they are designated by the numeral 30) or of these openings and bevelled surfaces 32 shaped as frustums of right circular cones. These surfaces 32 are used to facilitate conventional distribution tubes (not shown) being inserted into and through the ports 30. These bevelled surfaces 32 also add physical strength and reinforcement to edge 34 extending around and actually defining each of the ports 30.

The location of the openings or ports 30 is quite important to this invention. They are positioned so that an imaginary line B—B drawn perpendicular to the center (not separately numbered) of each of these ports 30 will pass through the previously identified center A. This is quite important in achieving a significant economy in the manufacture of the fitting 10. As a consequence of this orientation of the ports 30 it is comparatively simple to manufacture these ports and/or tools for their production by utilizing a conventional drill held in axial alignment with the imaginary line B—B noted in the preceding. The bevelled surfaces 32 can of course can be obtained in the same way through the use of a countersink.

If the fitting 10 were not formed in this manner it would be comparatively expensive and difficult to shape the ports 30 so that they were exactly circular. It is considered quite desirable for the ports 30 to be circular in a compression fitting so that a satisfactory holding action will always be achieved when tubes such as the tube 35 shown in phantom in FIG. 2 are forced through these ports 30 so as to be held under compression in a known manner. Because of the use of the separate passages 24 there is little danger of any one such tube associated with one of the ports 30 coming in contact with or otherwise interfering with the next adjacent such tube.

In order to promote equal volumes of water being delivered to each of the ports 30 when such tubes are in place it is considered preferable to utilize a distribution plate 14 as shown. This plate 14 is clamped between the cap 12 and a shoulder 36 on the base 16. It contains a plurality of internal passages 38, each of which leads to one of the ports 30. The base 16 will normally have an internal space 40 to serve as a distribution manifold in conveying water passing from a conventional connection 42 to the individual ports 30. Preferably, a known type of flow control device (not shown) will be located in this space 40.

If desired the fitting 10 can be modified as shown in FIG. 3 so as to replace the flat walls 28' with corresponding spherical walls 28 centered about the same point as previusly described. With such a structure the thickness between wall 18 and walls 28 is uniform adjacent to each of the passages 24.

The distribution fitting 10 is considered to be especially desirable because of an economic consideration indicated but not completely discussed in the preceding discussion. One of the major factors contributing to the cost of any injection molded part is the cost of the dies used to produce them. Because of the use of the spherical wall 18 and the use of ports 30 which are oriented as indicated in the preceding discussion it is possible to construct dies from the manufacture of the cap 12 at a comparatively nominal cost. This is important in holding down the costs of these caps 12 and the entire fitting 10.

It is to be emphasized that the economic advantage is not confined to the cost of the dies used in producing the cap 12. Because of the construction involved in connection with the spherical wall 18 and the ports 30 it is possible to locate these ports 30 quite close to one another without making it extremely difficult or impossible to gain access to these ports 30 in inserting or removing tubing in or from them. By virtue of the fact that these ports 30 are closely spaced in a comparatively small fitting 10 savings in material are achieved which would not be obtained if the ports 30 were spaced further from one another. Because, in effect, the lines corresponding to the line B-B extending through all of the ports 30 go out radially or in a radial like manner more or less as rays emitted from a source such as the sun, there is room to gain access to tubes used with the ports 30 as these tubes are installed or removed from the cap 12 even though the ends of the tubes within the fitting 10 are so closely spaced with respect to one another that they cannot be conveniently engaged manually. Further because of the fact that only a single row of these ports 30 is used in connection with the flat top and the cylindrical wall 22 it is possible for the thumb and fingers of the hand to gain access to opposed sides of any tubing employed whereas such access is not conveniently available generally along the row of ports 30. These factors are considered to be significant from a commercial standpoint.

I claim:

1. In an injection molded distribution fitting having a plurality of outlet port means for forming a compression joint for receiving a distribution tube, each of said port means being adapted to be connected to a distribution line the improvement which comprises:

said fitting having a spherical peripheral wall, said spherical wall having both a spherical interior and a spherical exterior, said port means being located in said wall, said wall having a uniform thickness adjacent to each of said port means.

each of said port means is defined by a circular hole located in said peripheral wall, each such hole being located so that an imaginary line extending perpendicular to its center will intersect the center of said peripheral wall and each of said port means being shaped so as to include a beveled exterior surface leading to an edge, said edge surrounding and defining said circular hole, a tube located within each of said ports so as to be held therein under compression.

2. A distribution fitting as claimed in claim 1 wherein:

said port means are located immediately adjacent to one another in a row extending around the center of said peripheral wall, and said spherical wall is shaped as a truncated portion of a sphere and has a flat top.

3. A distribution fitting as claimed in claim 1 wherein:

said fitting includes a separate internal flow passage leading to each of said ports, distributing means for distributing a fluid to each of said passages.

4. In an injection molded distribution fitting having a plurality of outlet port means for forming a compression joint for receiving a distribution tube, each of said port means being adapted to be connected to a distribution line the improvement which comprises:

said fitting having a peripheral wall, said wall having both a spherical exterior and a flat interior adjacent to each of said port means, said port means being located in said wall, said wall having a uniform thickness adjacent to each of said port means.

each of said port means is defined by a circular hole located in said peripheral wall, each such hole being located so that an imaginary line extending perpendicular to its center will intersect the center of said peripheral wall and each of said port means being shaped so as to include a beveled exterior surface leading to an edge, said edge surrounding and defining said circular hole, a tube located within each of said ports so as to be held therein under compression.

5. A distribution fitting as claimed in claim 4 wherein:

said port means are located immediately adjacent to one another in a row extending around the center of said peripheral wall, and said spherical wall is shaped as a truncated portion of a sphere and has a flat top.

6. In an injection molded distribution fitting having a plurality of outlet ports, each of said ports being adapated to be connected to a distribution line the improvement which comprises:

said fitting having a peripheral wall, said wall having both a spherical interior and a spherical exterior, said ports being located in said wall, said wall having a uniform thickness adjacent to each of said ports, each of said ports is defined by a circular hole located in said peripheral wall, each such hole being located so that an imaginary line extending perpendicular to its center will intersect the center of said peripheral wall and each of said ports being shaped so as to include a beveled exterior surface leading to an edge, said edge surrounding and defining said circular hole, and a tube means located within each of said ports so as to be held therein under compression.

7. A distribution fitting as claimed in claim 6 wherein:

said ports are located immediately adjacent to one another in a row extending around the center of said peripheral wall, and said spherical wall is shaped as a truncated portion of a sphere and has a flat top.

8. In an injection molded distribution fitting having a plurality of outlet ports, each of said ports being adapted to be connected to a distribution line the improvement which comprises:

said fitting having a peripheral wall, said wall having both a spherical interior and a flat interior adjacent to each of said ports, said ports being located in said wall, said wall having a uniform thickness adjacent to each of said ports, each of said ports is defined by a circular hole located in said peripheral wall, each such hole being located so that an imaginary line extending perpendicular to its center will intersect the center of said peripheral wall and each of said ports being shaped so as to include a beveled exterior surface leading to an edge, said edge surrounding and defining said circular hole, and a tube means located within each of said ports so as to be held therein under compression.

9. A distribution fitting as claimed in claim 8 wherein:

said ports are located immediately adjacent to one another in a row extending around the center of said peripheral wall, and said spherical wall is shaped as a truncated portion of a sphere and has a flat top.

* * * * *